Nov. 16, 1965    R. H. MARTIN    3,217,576
PLASTIC ARTICLE CUT-OUT AND PERFORATING APPARATUS
Filed Dec. 23, 1963    3 Sheets-Sheet 1

INVENTOR.
RAYMOND H. MARTIN
BY
ATTORNEYS

INVENTOR.
RAYMOND H. MARTIN
BY
ATTORNEYS

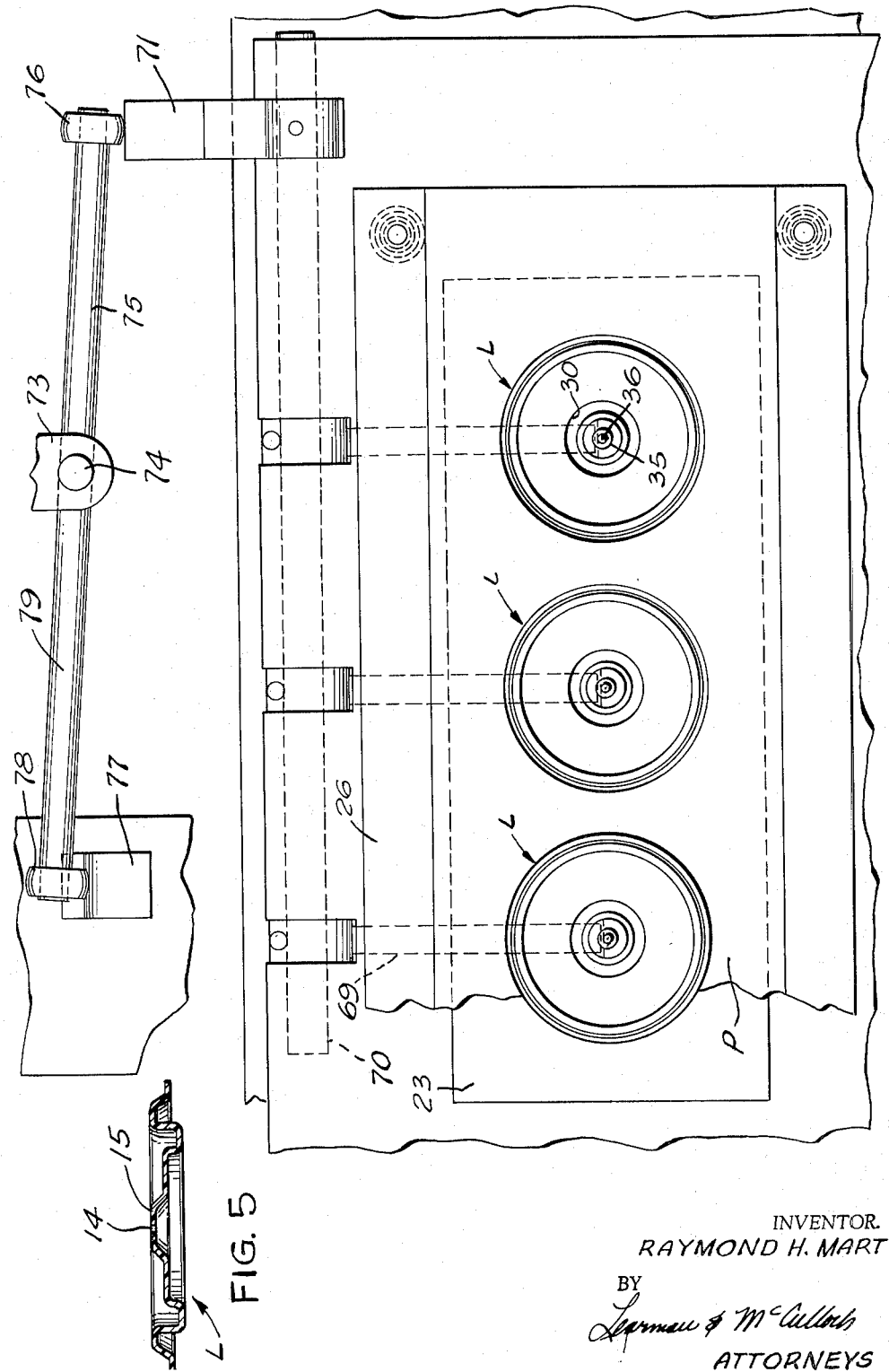

United States Patent Office 3,217,576
Patented Nov. 16, 1965

3,217,576
PLASTIC ARTICLE CUT-OUT AND
PERFORATING APPARATUS
Raymond H. Martin, Beaverton, Mich., assignor to Brown Machine Company of Michigan, Inc., a corporation of Michigan
Filed Dec. 23, 1963, Ser. No. 332,547
10 Claims. (Cl. 83—214)

This invention relates to machines for cutting out products such as cup lids from a plastic sheet having lengthwisely successive, transversely extending rows of spaced apart hot drink cup lids or the like preformed therein and, in the same operation, piercing vent holes in the lids or like parts.

It is a prime object of the invention to provide a machine of the type described which can be employed in a production line immediately ahead of a continuous, differential pressure product forming machine to receive the plastic sheet or web continuously therefrom.

A further object of the invention is to provide apparatus for piercing vent holes in plastic cup lids or the like during the lid severing operation to avoid the necessity of a separate operation for punching vent holes, which entails additional tooling and feed mechanism, requires additional time, and impairs producton line efficiency.

Another object of the invention is to provide a machine of this type which permits the elimination of certain otherwise critical forming tolerances and thus provides a more flexible manufacturing operation.

A further object of the invention is to provide apparatus of the character described wherein a piercing tool is carried by each cut-out member to the immediate vicinity of the plastic web and is operated during the time the cut-out member is moving forwardly to pierce a vent hole in each lid just prior to the time the lid is severed at the time when the lid is still supported by the web.

Another object of the invention is to provide a cut-out member mounted piercing tool of the character described which is retracted from the part before the cut-out member is withdrawn from the die cavity, so that there will be no tendency of the part to withdraw with the piercing tool and the part drops freely to collecting mechanism.

Another object of the invention is to design apparatus for piercing vent holes in cup lids or the like which is so constructed that the piercing punch is carried axially within the cut-out member to insure that the piercing punch must accurately punch the plastic lids in the steam domes formed therein.

Still another object of the invention is to provide lid cut-out and piercing apparatus of simple and economical construction which is highly reliable in operation and will perform continuously for periods of long duration with a minimum of maintenance.

Other objects and advantages of the invention will be pointed out specifically or will become apparent from the following description when it is considered in conjunction with the appended claims and the accompanying drawings, in which:

FIGURE 4 is an enlarged, fragmentary, front elevational view taken on the line 4—4 of FIGURE 3; and FIGURE 5 is a sectional elevational view of a cup lid which has been cut out and perforated.

Figure 1:
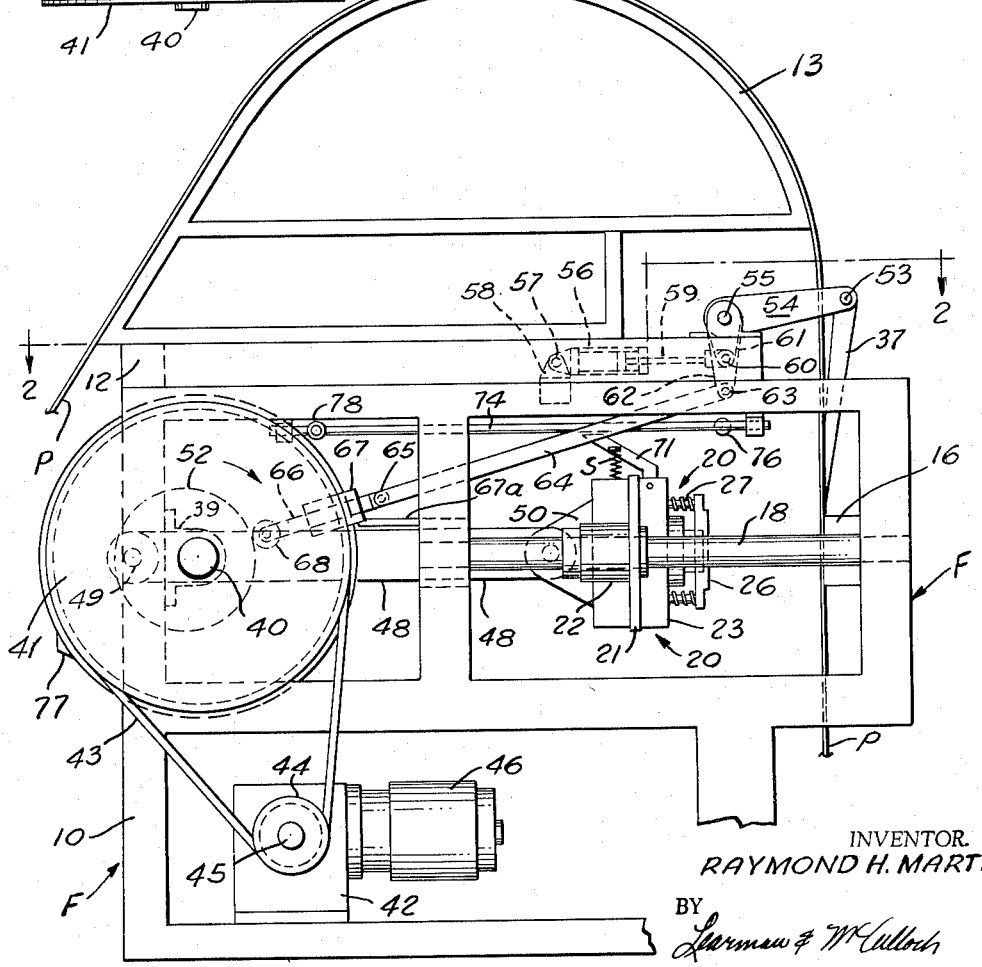
FIGURE 1 is a partly fragmentary, side elevational view of apparatus constructed in accordance with the invention, showing a plastic sheet or web trained over the guide frame of the machine and drawn down between the dies of the machine.

Referring now more particularly to the accompanying drawings, a letter F generally indicates the generally oblong frame of the machine, which may include fabricated side frames 10 connected at their ends by upper, lower, and intermediate end rails 11 in any suitable manner. Fixed on the top surfaces of the side members 10 are beams 12 which support a curvilinear frame 13 at each side of the machine to provide a guide for the plastic strip P which, as shown in FIGURE 1 particularly, leads up over the frames 13 and thence downwardly at the front of the frame F.

It is to be understood that the plastic strip or web P is supplied to the apparatus of the present invention from a continuous vacuum forming machine which differential pressure forms cup lids in lengthwisely successive rows extending transversely of the strip. In view of the scale employed in FIGURE 1, no attempt is made to show the lids which are impressed in the web P.

Figure 2:
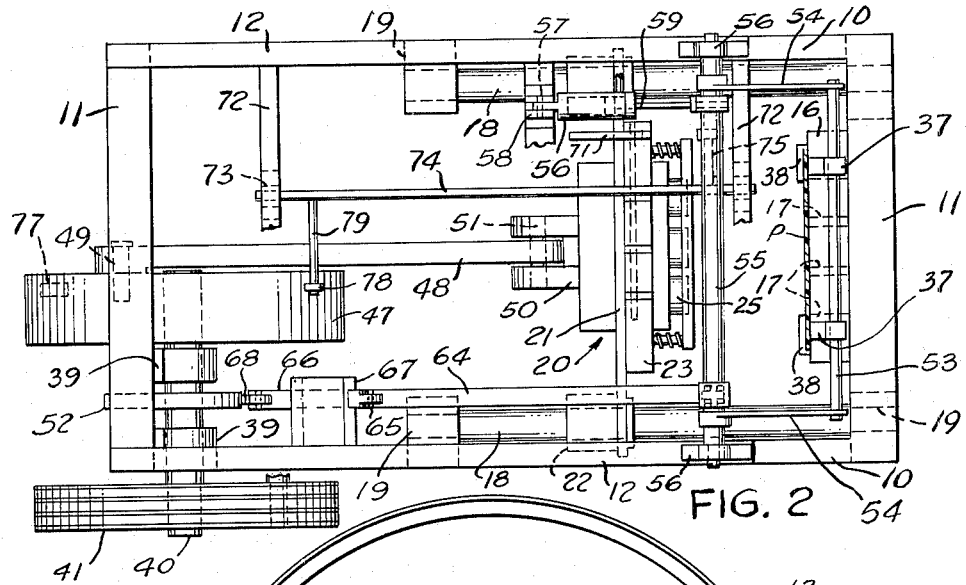
FIGURE 2 is a sectional top plan view taken on the line 2—2 of FIGURE 1.

The present invention is concerned with the severing of the cup lids L from the plastic web P and the punching of vent holes 14 (FIGURE 5) in the central dome portions 15 in each of the lids L. The vent holes 14 are provided to permit the escape of steam when a lid L is in place on a cup so that pressure will not build up under the lid which would force the lid off. To prevent beverage which may have escaped to the top of the lid L and become contaminated, from reentering through the vent hole 14, the dome 15 is of relatively small diameter and the vent hole 14 must be accurately punched. The plastic web P is indexed downwardly in successive increments in a manner to be presently described to dispose successive rows of lids L adjacent a stationary die block 16 which is secured to an intermediate end member 11 spanning the side frames 10. In the present instance, for purposes of convenience only, the stationary die block 16 is shown as having a series of three openings or die cavities 17 (FIGURE 2) and it will be assumed that three cup lids are formed in each row in the plastic web P. However, it is to be understood that more or fewer lids could be formed in the plastic web P by the forming machine and a comparable number of openings 17 provided in the die block 16.

Reciprocably mounted for to-and-fro movements horizontally toward and away from the die block 16 on side guide rods 18 which are fixed in blocks 19 connected to the side frame members 10 is a movable die assembly generally indicated at 20. The assembly 20 includes a cross slide 21 with slide bearings 22 mounted on the guide rods 18 for reciprocating movement. Provided on the front face of cross slide 21 is a die block 23 in which are provided recesses 24 for movable severing dies 25 which are aligned with the die openings 17 and cooperate with the marginal edges thereof to sever the lids L from the plastic web P. A stripper plate 26 is mounted on bolts or pins 27 extending from the die block 23, the bolts 27 having threaded ends 27a received in threaded openings 26a in the stripper plate 26. It will be seen that the die block 23 is bored as at 28 to receive the heads of the socket head bolts 27 and coil springs 29 are provided on the bolts 27 between the die block 23 and stripper plate 26 to normally urge the stripper plate 26 to a position in front of the front edge of dies 25. When the cross slide 21 is moved forwardly the stripper plate 26 first engages the plastic sheet or web P to press it against the stationary die block 16 and thence the severing dies travel forwardly to enter the die cavities 17, the edges 25a and 17a cooperating to sever the lids L from the plastic web P.

Figure 3:
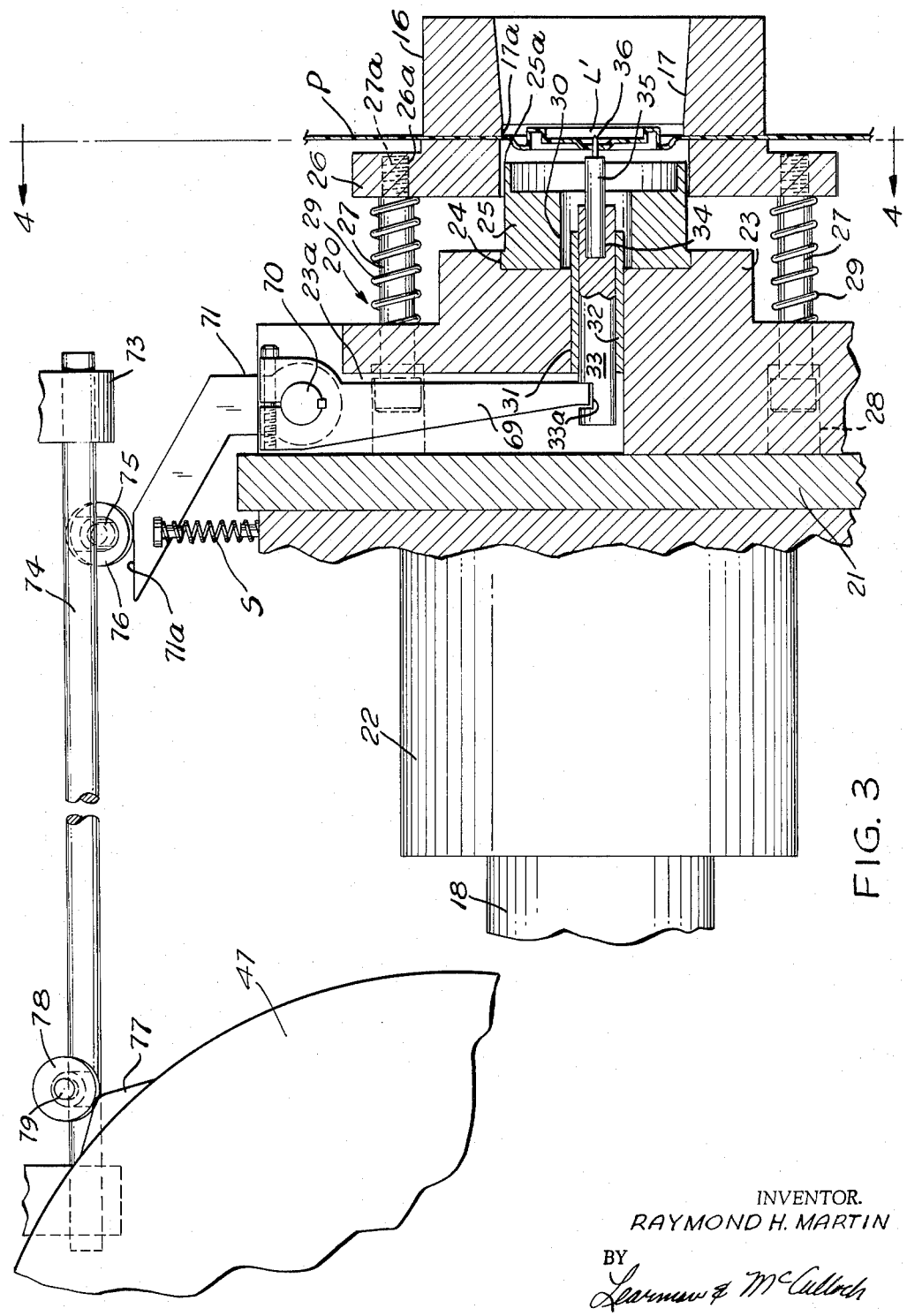
FIGURE 3 is an enlarged, sectional, fragmentary view illustrating cut-out and piercing tool elements and mechanism for operating them in timed relation.

It will be noted that the severing dies 25 are concentrically bored as at 30, and that the die block 23 is similarly bored as at 31 in axial alignment with each opening 24, to receive slide bearings 32. Received within each slide bearing 32, which is anchored in the die block 23, is a slide rod 33 which is bored at its front end as at 34 to receive the tool shaft 35 of a piercing pin 36. As demonstrated in FIGURE 3, each pin 36 is moved forwardly to enter the opposite lid portion L before the edge 25a of the surrounding severing die 25 engages the plastic web P. The pins 36 are brought forwardly by the severing die block 23 and then, in a manner to be presently described, moved forwardly at a faster rate of speed than the block 23 to pierce the lid portions L before the lid portions L are severed from the web.

The manner in which the cross slide 21 and each piercing pin 36 are driven in timed relation will be specifically explained. Each of these elements is also driven in timed relation with plastic web advancing fingers 37 which are actuated to move the plastic web P downwardly through angle guide members 38 or the like, once the piercing and severing operation has been completed and the die assembly 20 is moving rearwardly.

Mounted on the rear of the frame F of the machine by suitable means such as bearings 39 is a drive shaft 40 mounting a die pulley 41 which is driven from a speed reducer 42 by belts 43 trained around the pulley 41 and around a similar but smaller pulley 44 fixed on the output shaft 45 of the speed reducer 42. A suitable electric motor 46 may be employed to drive the speed reducer 42. Mounted on the shaft 40 is a fly wheel 47 to which a connecting rod 48 is pinned as at 49, the connecting rod 48 being connected with a clevis member 50 provided on the cross slide 21 by a suitable pin 51 and continuously reciprocating the movable die assembly 20.

The sheet advancing arms 37 are moved in timed relation with the movable die assembly 20 by a cam 52 mounted on the shaft 40. It will be seen that the arms 37 are fixed on a shaft 53 to which arms 54 are also fixed, the arms 54 being mounted fast on a rock shaft 55 journaled in bearings 56 provided on the front ends of the beams 12. An air cylinder 56, pivotally supported as at 57 on a bracket 58 on a brace extending from the one beam 12, has a piston rod 59 which is pivotally connected as at 60 to a lever 61 which depends from and is fixed to the rock shaft 56. Air under pressure is continuously maintained in the right end of the cylinder 56 in FIGURE 1 to tend to force the lever 61 rearwardly. Also fixed to and depending from the rock shaft 55 is an arm 62 which is pivotally connected at its lower end, as at 63, to a connecting bar 64 which is actuated by the cam 52. In practice, the slide rod 64 may be pivotally connected as at 65 to a tappet 66 (FIGURES 1 and 2) which is slidably received in a tappet guide 67 mounted on a brace 67a extending from the one side frame member 10 and which has a follower roller 68 in engagement with the cam 52.

It will be noted that above each of the piercing pin guide rods 33 (FIGURE 3) the die block 23 is recessed as at 23a to accommodate one end of an actuating finger 69 which has its lower end received in a notch or groove 33a in the corresponding piercing pin guide rod 33. The fingers 69 which move the guide rods to and fro relatively to the die assembly 20 are pivotally mounted on a rock shaft 70 which is journaled by the carriage die block 23. Also fixed to the shaft 70 is an actuating lever 71 which is shown provided with a horizontal surface 71a. Cross bar members 72 (FIGURE 2) spanning the side frames 10 are provided with depending bearings 73 journaling a longitudinally extending rock shaft 74 which has a laterally extending front arm 75 provided thereon adapted to engage and actuate the lever 71 when the lever 71 has moved forwardly to a position beneath the roller 76 on the arm 75. Provided on the flywheel 47 is a cam projection 77 adapted to engage the roller 78 on a laterally extending rear arm 79 also fixed on the rock shaft 74 but at the rear end thereof.

In operation, when the movable die assembly 20 is in retracted position, as in FIGURE 1, the cam 52 is permitting the piston rod 59 of the air cylinder 56 to move the rock shaft 55 in FIGURE 1 clockwisely, which accordingly forces the sheet advancing arms 37 downwardly and indexes the plastic web P downwardly an increment sufficient to dispose another row of unsevered lids L in front of the die cavities 17. As the drive shaft 40 turns clockwisely in FIGURE 1, the cam 52 forces the slide rod 64 outwardly to rock the arms 62 and rock shaft 55 counterclockwisely and restore the arms 37 to upward position. It will be noted that the cylinder 56 in this machine furnishes the power for advancing the web P, as well as functioning to keep the roller 68 in engagement with the cam 52, so that if, for some reason, the fingers 37 are jammed by foreign material or the like and prevented from moving downwardly, the mechanism will not be damaged. As the work advancing fingers 37 are moved upwardly by the slide rod 64 and cam 52, the connecting rod 48 moves the movable die assembly 20 forwardly and the actuating lever 71 moves beneath the roller 76 which is connected by the arm 75 to rock shaft 74. At this time the cam projection 77 on the flywheel 47 sharply lifts the roller 78 on the arm 79 connecting with rock shaft 74 and rocks the shaft 74 in a clockwise direction (FIGURE 4) to depress the actuating lever 71. This is a sharp movement which occurs while the die assembly 20 is moving forwardly and functions to pivot the rock shaft 70 counterclockwisely in FIGURE 3 and move the piercing pins 36 relatively to the advancing die block 23 into the domes 15 of the unsevered lid portions L. As the actuating lever 71 continues to move forwardly with the die assembly 20, it passes beyond the roller 76 so that return spring S quickly restores it to original position. The fingers 69 retract the pins 36 from the unsevered lids L prior to the time that the leading edges 25a of the dies 25 are withdrawn from the cavities 17 in the fixed die block 16. Rock shaft 74 is restored by the forces of gravity. It will be noted that just prior to the vent hole piercing operation the stripper plate 26 has engaged the plastic web P to hold it securely in position during the subsequent piercing and severing operations, the springs 29 being compressed as the severing die block 23 moves forwardly, once the stripper plate 26 engages the plastic web P, to furnish the clamping force necessary. As the connecting rod 48 commences to move rearwardly, the stripper plate 26 continues to clamp the severed plastic web P in position while the severing dies 25 back out of the die cavities 17, so that the plastic web P is prevented from returning with the severing dies 25. With the rock shaft 74 restored to original position, the actuating lever 71 is not operated during the return stroke of the die assembly 20 and remains in its normally retracted position. Once the movable die assembly 20 nears its retracted position, the cam 52 has rotated sufficiently to permit the slide bar 64 to move rearwardly under the pressure of the piston rod 59 of cylinder 56 and the cycle is repeated.

It should be apparent that a practical machine has been invented which can be run continuously at the speed required to handle the full output of a continuous forming machine.

It is to be understood that the drawings and descriptive matter are in all cases to be interpreted as merely illustrative of the principles of the invention, rather than as limiting the same in any way, since it is contemplated that various changes may be made in the various elements to achieve like results without departing from the spirit of the invention or the scope of the appended claims.

What is claimed is:

1. In apparatus for cutting out preformed products such as cup lids from a plastic sheet, the combination which comprises: frame means; lid cut-out means on said frame means; advancing means for moving the sheet relatively to the frame means to successively dispose increments of said sheet opposite said cut-out means;

drive means; means connected thereto for moving said cut-out means forwardly to engage said cut-out means with said sheet; vent hole piercing means carried by said cut-out means; and means actuated before said cut-out means engages the sheet to move said piercing means relatively to said cut-out means to pierce the sheet.

2. In apparatus for cutting out preformed products such as cup lids from a plastic sheet, the combination which comprises: frame means; lid cut-out means mounted for movement on said frame means; advancing means for moving the sheet relatively to the frame means to successively dispose increments of said sheet opposite said cut-out means; drive means; means connected thereto for moving said cut-out means forwardly to engage said cut-out means with said sheet; vent hole piercing means; and means actuated while said cut-out means is traveling forwardly, and just before said cut-out means engages the sheet, to move said piercing means to pierce the sheet.

3. In trimming apparatus for severing preformed products such as cup lids from a plastic web in which they are disposed in lengthwisely successive, transversely extending rows, the combination which comprises: frame means; movable severing die means mounted for movement on said frame means; stationary severing die means mounted by said frame means in fixed position opposite said movable severing die means; advancing means for moving the web vertically relatively to the frame means to successively dispose lengthwise increments of said web vertically opposite said severing die means; drive shaft means; means connected thereto for moving said movable severing die means forwardly to engage said movable severing die means with said sheet; vent hole piercing means carried by said movable severing die means for axial movement relative thereto; means connected with said drive shaft means controlling said advancing means for actuating said advancing means when the movable severing die means is in retracted position; and means, actuated by said drive shaft means before said movable severing die means engages the web to move said piercing means forwardly relatively to said severing die means to pierce the unsevered cup lids in the web, and to restore said piercing means.

4. In trimming apparatus for severing preformed products such as cup lids from a plastic web in which they are disposed in lengthwisely successive, transversely extending rows, the combination which comprises: frame means; movable severing die means mounted for to-and-fro horizontal movement on said frame means; stationary severing die means mounted by said frame means in fixed position opposite said movable severing die means; advancing means for moving the web vertically relatively to the frame means to successively dispose lengthwise increments of said web vertically opposite said severing die means; drive shaft means; means for continuously rotating said drive shaft means; connecting rod means connected thereto for moving said movable severing die means forwardly to engage said movable severing die means with said sheet; vent hole piercing means carried by said movable severing die means for axial movement relative thereto; means connected with said drive shaft means controlling said advancing means for actuating said advancing means when the movable severing die means is in retracted position; and means, actuated by said drive shaft means before said movable severing die means engages the web to move said piercing means forwardly relatively to said severing die means to pierce the unsevered cup lids in the web, and to restore said piercing means.

5. The combination defined in claim 4 in which said advancing means comprises advancing finger means; said means for controlling said advancing finger means comprises: cam means on said drive shaft means, and linkage mechanism in following relationship therewith connecting with said finger means; and yieldable means is provided connected to said linkage mechanism to urge said advancing fingers in a direction to advance the sheet and maintain the linkage mechanism in engagement with the cam means.

6. The combination defined in claim 5 in which said yieldable means comprises a fluid pressure cylinder and piston rod assembly with fluid under pressure constantly urging the piston rod thereof in one direction.

7. The combination defined in claim 4 in which flywheel means is provided on said drive shaft means; and said means actuated by said drive shaft means before said movable severing die means engages the web comprises: a cam projection on said flywheel means, and linkage mechanism in following relationship therewith actuating said piercing means.

8. In trimming aparatus for severing preformed products such as cup lids from a plastic web in which they are disposed in lengthwisely successive, transversely extendnig rows, the combination which comprises: frame means; movable severing die means mounted for movement on said frame means; stationary severing die means mounted by said frame means in fixed position opposite said movable severing die means; advancing means for moving the web vertically relatively to the frame means to successively dispose lengthwise increments of said web vertically opposite said severing die means; drive shaft means; means connected thereto for moving said movable severing die means forwardly to engage said movable severing die means with said sheet; vent hole piercing means carried by said movable severing die means for axial movement relative thereto; means controlling said advancing means for actuating said advancing means when the movable severing die means is in retracted position; cam means on said drive shaft means; linkage means connected therewith and actuated thereby; and means, carried by said severing die means movable forwardly relative to said linkage means but operated thereby before said movable severing die means engages the web to move said piercing means forwardly relatively to said severing die means to pierce the unsevered cup lids in the web, and to restore said piercing means.

9. The combination defined in claim 8 in which said linkage means comprises a rock shaft having a part in engagement with said cam means.

10. The combination defined in claim 8 in which said means carried by the severing die means and operated by the linkage means comprises: a rock shaft journaled by the severing die means, an actuating lever projecting from the rock shaft and engaged by the linkage means at the time the cam means actuates the linkage means, and actuating finger means connecting said rock shaft and piercing means.

References Cited by the Examiner
UNITED STATES PATENTS

| | | | |
|---|---|---|---|
| 2,145,725 | 1/1939 | Jamieson | 83—681 |
| 2,251,135 | 7/1941 | Iknayan | 18—19 |
| 2,285,447 | 6/1942 | Lichter | 83—214 |
| 2,319,766 | 5/1943 | Cox | 83—213 |
| 2,802,526 | 8/1957 | Hillman. | |

WILLIAM W. DYER, JR., *Primary Examiner.*